US009869574B2

(12) United States Patent
Nicks

(10) Patent No.: US 9,869,574 B2
(45) Date of Patent: Jan. 16, 2018

(54) SYSTEM AND METHOD OF ALLOCATING OBJECTS WITHIN STORAGE BINS

(71) Applicant: The Boeing Company, Chicago, IL (US)

(72) Inventor: Eric Nicks, Defiance, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/155,768

(22) Filed: May 16, 2016

(65) Prior Publication Data
US 2017/0328759 A1 Nov. 16, 2017

(51) Int. Cl.
G01F 17/00 (2006.01)
B64D 11/00 (2006.01)
B64D 45/00 (2006.01)
G01B 21/28 (2006.01)
G01B 21/18 (2006.01)
G01B 21/20 (2006.01)
G06Q 50/30 (2012.01)

(52) U.S. Cl.
CPC ............ G01F 17/00 (2013.01); B64D 11/003 (2013.01); B64D 45/00 (2013.01); G01B 21/18 (2013.01); G01B 21/20 (2013.01); G01B 21/28 (2013.01); G06Q 50/30 (2013.01)

(58) Field of Classification Search
CPC ........ G01B 21/20; G01B 21/28; G01B 21/18; G01F 17/00; B64D 11/003
See application file for complete search history.

(56) References Cited

U.S. PATENT DOCUMENTS

| 7,464,897 B2 * | 12/2008 | Ritts | B64D 11/003 244/118.5 |
|---|---|---|---|
| 7,933,733 B2 * | 4/2011 | Ashrafzadeh | G01F 23/26 340/686.1 |
| 8,704,642 B2 * | 4/2014 | Chen | G06K 17/00 235/382 |
| 8,994,546 B2 | 3/2015 | Breed et al. | |
| 9,163,975 B2 * | 10/2015 | Haber | G01F 23/292 |
| 9,371,035 B2 * | 6/2016 | Cuddihy | G01J 5/00 |
| 9,518,774 B2 * | 12/2016 | Miller | F25C 5/182 |
| 2004/0066500 A1 * | 4/2004 | Gokturk | G01C 11/30 356/4.01 |
| 2008/0251640 A1 * | 10/2008 | Johnson | B64D 11/003 244/118.1 |
| 2013/0290221 A1 * | 10/2013 | Jindel | G06Q 10/08 705/500 |
| 2014/0084947 A1 * | 3/2014 | Fortuna | G01F 17/00 324/663 |
| 2014/0172360 A1 * | 6/2014 | Folk | G01F 23/246 702/156 |

(Continued)

Primary Examiner — Thomas Randazzo
(74) Attorney, Agent, or Firm — Armstrong Teasdale LLP

(57) ABSTRACT

A method of allocating objects within a plurality of storage bins including monitoring motion within the plurality of storage bins, wherein each storage bin of the plurality of storage bins includes a profile sensor coupled therein, and activating the profile sensor coupled within a first storage bin. The profile sensor activated based on detection of motion within the first storage bin. The method also includes determining, with the profile sensor, an available capacity within the first storage bin, and transmitting an indication of the available capacity within the first storage bin.

17 Claims, 4 Drawing Sheets

(56) References Cited

U.S. PATENT DOCUMENTS

| | | | | |
|---|---|---|---|---|
| 2015/0051927 A1* | 2/2015 | Dueser | ................. | G06Q 10/02 |
| | | | | 705/5 |
| 2015/0317761 A1* | 11/2015 | Lee | ................. | G06Q 30/02 |
| | | | | 701/465 |
| 2015/0323366 A1* | 11/2015 | Kekalainen | ................. | G01D 11/30 |
| | | | | 702/188 |
| 2016/0109280 A1* | 4/2016 | Tiu | ................. | B64D 11/003 |
| | | | | 702/173 |
| 2016/0239795 A1* | 8/2016 | Burch, V | ................. | G01F 17/00 |

\* cited by examiner

SYSTEM AND METHOD OF ALLOCATING OBJECTS WITHIN STORAGE BINS

BACKGROUND

The field of the present disclosure relates generally to overhead storage bin assemblies and, more specifically, to a system and method of determining and displaying an available capacity within overhead storage bins to facilitate efficient use thereof.

Modern day flights are typically booked to full capacity, which makes overhead storage space a precious and limited commodity. As such, it is generally difficult for later boarding passengers to find sufficient or conveniently located overhead storage space for their carryon luggage. For example, the overhead storage space may be at full capacity before all the carryon luggage has been stowed, which causes frustration for the passengers and delay when loading the carryon luggage beneath the aircraft. Moreover, available overhead space may be located several rows away from a passenger's seat, which causes delays in embarking and disembarking from the aircraft. Additional delay is also caused when the passengers or flight attendants open and close the overheard storage bins in search of bins that have been closed prematurely when not at full capacity.

BRIEF DESCRIPTION

In one aspect, a method of allocating objects within a plurality of storage bins is provided. The method includes monitoring motion within the plurality of storage bins, wherein each storage bin of the plurality of storage bins includes a profile sensor coupled therein, and activating the profile sensor coupled within a first storage bin. The profile sensor activated based on detection of motion within the first storage bin. The method also includes determining, with the profile sensor, an available capacity within the first storage bin, and transmitting an indication of the available capacity within the first storage bin.

In another aspect, a system for use in allocating objects within a plurality of storage bins is provided. The system includes a motion sensor coupled within each storage bin of the plurality of storage bins, and a profile sensor coupled within each storage bin. The motion sensor is configured to monitor motion within the plurality of storage bins, and the profile sensor is configured to determine an available capacity within the plurality of storage bins. The system also includes a controller configured to activate the profile sensor coupled within a first storage bin of the plurality of storage bins. The profile sensor is activated based on detection of motion within the first storage bin. The controller is also configured to transmit an indication of the available capacity within the first storage bin.

In yet another aspect, a vehicle is provided. The vehicle includes a passenger cabin and a plurality of storage bins coupled within the passenger cabin. The plurality of storage bins include at least a first storage bin. The vehicle also includes an object allocation system including a motion sensor coupled within each storage bin of the plurality of storage bins, and a profile sensor coupled within each storage bin. The motion sensor is configured to monitor motion within the plurality of storage bins, and the profile sensor is configured to determine an available capacity within the plurality of storage bins. The system also includes a controller configured to activate the profile sensor coupled within a first storage bin of the plurality of storage bins. The profile sensor is activated based on detection of motion within the first storage bin. The controller is also configured to transmit an indication of the available capacity within the first storage bin.

DETAILED DESCRIPTION

The implementations described herein relate to a system and method of determining and displaying an available capacity within overhead storage bins to facilitate efficient use thereof. More specifically, the system described herein includes one or more sensors coupled within each storage bin for building a profile of the luggage contained therein. For example, the sensors determine the available capacity within each storage bin, and provide an indication of the available capacity to either the passengers or flight crew of an aircraft. As such, the passengers or flight crew are able to quickly determine the location of available overhead storage space when boarding the aircraft. The sensors also determine a shape of the luggage contained within the overhead storage bins. Determining the shape of the luggage facilitates providing a rearrangement recommendation for moving luggage between different overhead storage bins in a space saving and efficient manner. As such, overhead storage space utilization is enhanced while also reducing boarding delays and passenger frustration. The system described herein is also designed to be energy efficient, low cost, and capable of retrofit within existing aircraft.

As used herein, an element or step recited in the singular and proceeded with the word "a" or "an" should be understood as not excluding plural elements or steps, unless such exclusion is explicitly recited. Furthermore, references to "exemplary implementation" or "one implementation" of the present disclosure are not intended to be interpreted as excluding the existence of additional implementations that also incorporate the recited features.

Figure 1:
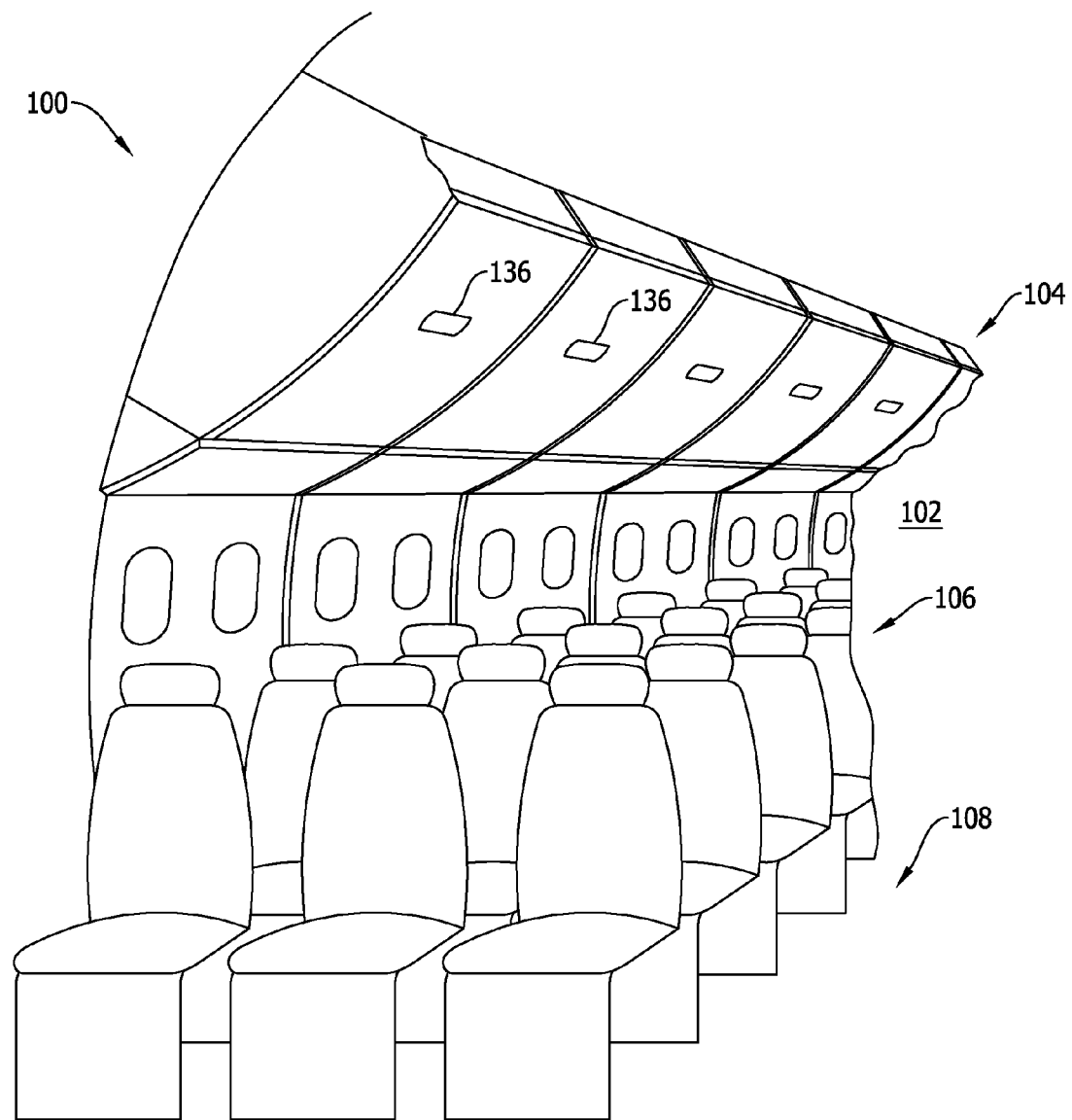
FIG. 1 is an internal view of an exemplary aircraft.

FIG. 1 is an internal view of an exemplary aircraft 100 (i.e., a vehicle). In the exemplary implementation, aircraft 100 includes a passenger cabin 102 and a plurality of overhead storage bins 104 coupled within passenger cabin 102. Passenger cabin 102 also includes a seating area 106 and an aisle 108 extending along passenger cabin 102 for providing access to the plurality of overhead storage bins 104 and seating area 106. The plurality of overhead storage bins 104 are selectively positioned between an open position and a closed position for receiving and stowing one or more objects (e.g., luggage) therein. While described in the context of a passenger aircraft, application of the systems and methods described herein is not limited to passenger aircraft. For example, the systems and methods described herein may be implemented with any cargo-carrying vehicle such as, but not limited to, buses and trains.

Figure 2:
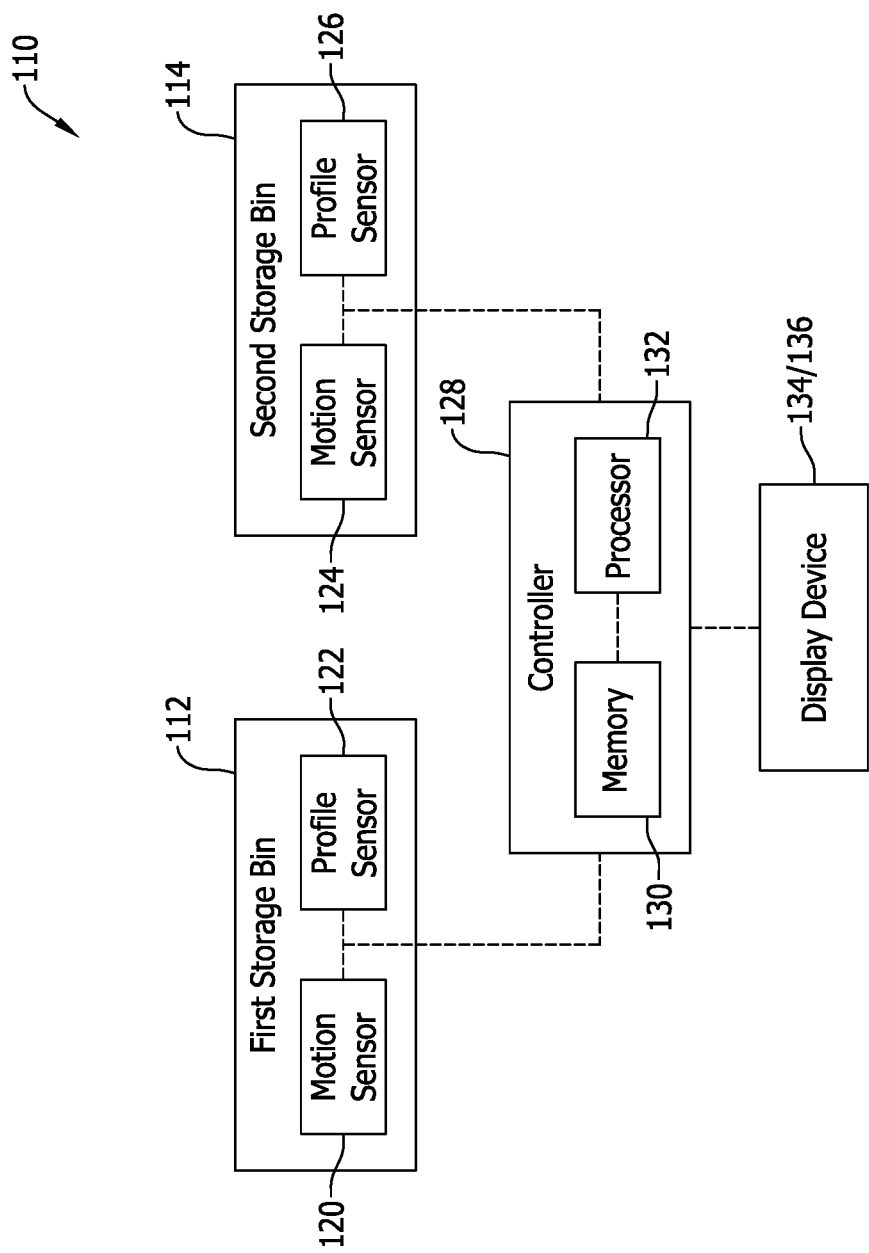
FIG. 2 is a schematic illustration of an exemplary object allocation system that may be used with the overhead storage bins shown in FIG. 1.

FIG. 2 is a schematic illustration of an exemplary object allocation system 110 that may be used with overhead storage bins 104 (shown in FIG. 1). In the exemplary implementation, overhead storage bins 104 include at least a first overhead storage bin 112 and a second overhead storage bin 114. Object allocation system 110 includes a motion sensor and a profile sensor coupled within each overhead storage bin of the plurality of overhead storage bins 104. For example, object allocation system 110 includes a first motion sensor 120 and a first profile sensor 122 coupled within first overhead storage bin 112, and a second motion sensor 124 and a second profile sensor 126 coupled within second overhead storage bin 114.

Motion sensors monitor and detect motion within the plurality of overhead storage bins 104. Any motion sensor may be coupled within the plurality of overhead storage bins 104 that enables object allocation system 110 to function as described herein. An exemplary motion sensor includes, but is not limited to, a passive infrared sensor, which is a low cost and energy efficient sensor. Moreover, as will be described in more detail below, profile sensors determine at least one of an available capacity or space within the plurality of overhead storage bins 104 or a shape of objects contained within the plurality of overhead storage bins 104. Any profile sensor may be coupled within the plurality of overhead storage bins 104 that enables object allocation system 110 to function as described herein. Exemplary profile sensors include, but are not limited to, an ultrasonic sensing device, or a laser range finder device.

Object allocation system 110 also includes a controller 128 coupled, either wired or wireless connectivity, in communication with motion sensors and profile sensors coupled within the plurality of overhead storage bins 104. Controller 128 includes a memory 130 and a processor 132, including hardware and software, coupled to memory 130 for executing programmed instructions. Processor 132 may include one or more processing units (e.g., in a multi-core configuration) and/or include a cryptographic accelerator (not shown). Controller 128 is programmable to perform one or more operations described herein by programming memory 130 and/or processor 132. For example, processor 132 may be programmed by encoding an operation as executable instructions and providing the executable instructions in memory 130.

Processor 132 may include, but is not limited to, a general purpose central processing unit (CPU), a microcontroller, a microprocessor, a reduced instruction set computer (RISC) processor, an open media application platform (OMAP), an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by processor 132, cause processor 132 to perform at least a portion of the functions described herein. The above examples are exemplary only, and thus are not intended to limit in any way the definition and/or meaning of the term processor.

Memory 130 is one or more devices that enable information such as executable instructions and/or other data to be stored and retrieved. Memory 130 may include one or more computer-readable media, such as, without limitation, dynamic random access memory (DRAM), synchronous dynamic random access memory (SDRAM), static random access memory (SRAM), a solid state disk, and/or a hard disk. Memory 130 may be configured to store, without limitation, executable instructions, operating systems, applications, resources, installation scripts and/or any other type of data suitable for use with the methods and systems described herein.

Instructions for operating systems and applications are located in a functional form on non-transitory memory 130 for execution by processor 132 to perform one or more of the processes described herein. These instructions in the different implementations may be embodied on different physical or tangible computer-readable media, such as memory 130 or another memory, such as a computer-readable media (not shown), which may include, without limitation, a flash drive and/or thumb drive. Further, instructions may be located in a functional form on non-transitory computer-readable media, which may include, without limitation, smart-media (SM) memory, compact flash (CF) memory, secure digital (SD) memory, memory stick (MS) memory, multimedia card (MMC) memory, embedded-multimedia card (e-MMC), and micro-drive memory. The computer-readable media may be selectively insertable and/or removable from controller 128 to permit access and/or execution by processor 132. In an alternative implementation, the computer-readable media is not removable.

In operation, and as will be described in more detail below, motion sensors monitor motion within the plurality of overhead storage bins 104, and controller 128 activates one or more profile sensors based on the detection of motion within respective overhead storage bins 104. As such, the profile sensors are not continuously scanning overhead storage bins 104, and the energy efficiency of object allocation system 110 is increased. Controller 128 then analyzes data received from the profile sensors, determines an available capacity within the plurality of overhead storage bins 104 based on the data received from the profile sensors, and transmits an indication of the available capacity within the plurality of overhead storage bins 104.

In some implementations, object allocation system 110 includes a display device 134 coupled, either wired or wirelessly, in communication with controller 128. Display device 134 receives the indication of the available capacity within the plurality of overhead storage bins 104 from controller 128. Display device 134 also displays the available capacity for viewing by users, such as flight crew personnel or a passenger boarding aircraft 100 (shown in FIG. 1), for example. The users are then able to easily determine where available overhead storage space is located within aircraft 100.

Referring to FIG. 1, in one implementation, a plurality of display devices 136 positioned at the plurality of overhead storage bins 104. More specifically, each overhead storage bin 104 includes display device 136 coupled thereto. Each display device 136 is individually operable from each other for displaying the available capacity within each respective overhead storage bin 104. In the exemplary implementation, display devices 136 are embodied as a light-emitting diode (LED) indicator including a plurality of LEDs (not shown) selectively activated for displaying the capacity of each overhead storage bin 104. As such, the available capacity within the plurality of overhead storage bins 104 is viewable to the users traveling along aisle 108.

Alternatively, or in addition to coupling display devices 136 to each overhead storage bin 104, display device 134 is positioned remotely from the plurality of overhead storage bins 104. More specifically, display device 134 receives the aggregate indications of the available capacity within the plurality of overhead storage bins 104, and is located such that users can determine where available overhead storage space is located without being positioned at the available overhead storage bin 104. For example, in one scenario, display device 134 is positioned at an entryway (not shown) of aircraft 100 such that passengers can view potentially available overhead storage space as they are boarding aircraft 100. Alternatively, display device 134 is implemented on a portable handheld device (not shown), such as a tablet, operated by flight crew personnel located throughout passenger cabin 102. As such, the flight crew personnel are able to view the portable handheld device and direct passengers to overhead storage bins 104 having available storage space.

Moreover, alternatively, controller 128 transmits the aggregate indications of the available capacity within the plurality of overhead storage bins 104 to a downloadable mobile application on a passenger's mobile device.

Figure 3:
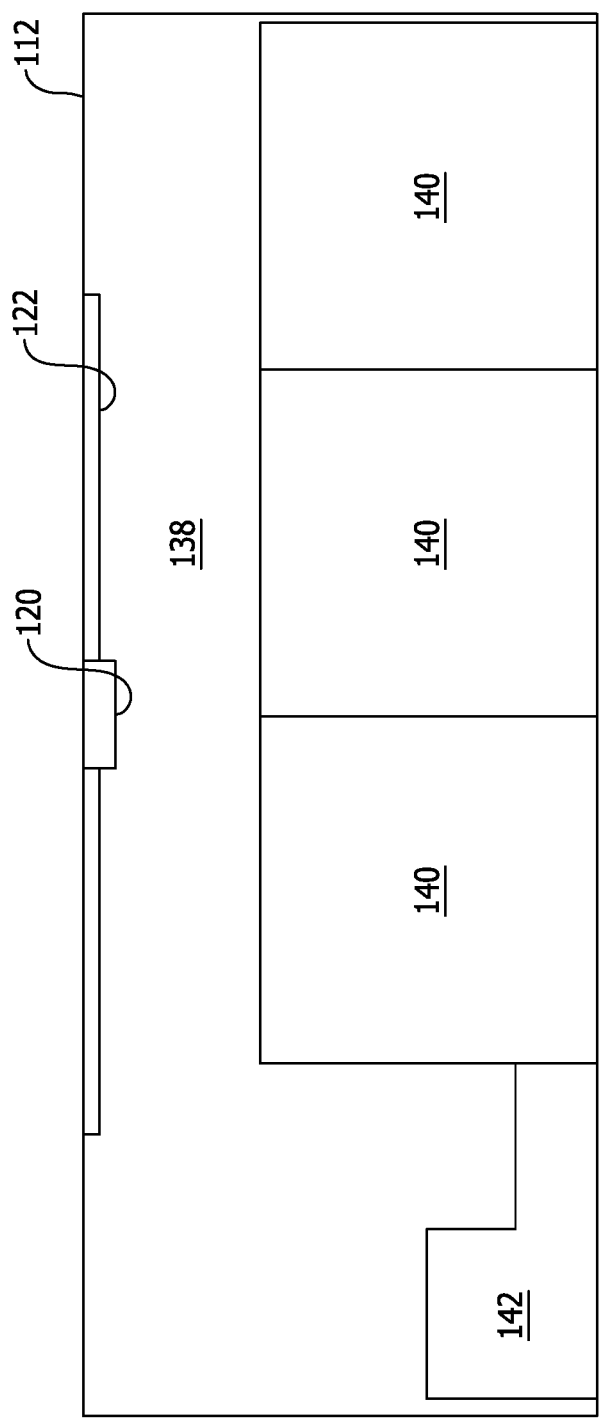
FIG. 3 is a schematic internal view of one of the overhead storage bins shown in FIG. 1.

FIG. 3 is a schematic internal view of one of overhead storage bins 104 (shown in FIG. 1), such as first overhead storage bin 112. In the exemplary implementation, first overhead storage bin 112 includes an interior 138 and a plurality of objects positioned within interior 138. For example, as shown, interior 138 includes three full-sized objects 140 (e.g., a full-sized carryon bag) and a smaller object 142. As described above, first profile sensor 122 and second profile sensor 126 (shown in FIG. 2) determine at least one of an available capacity or space within or a shape of the objects contained within first overhead storage bin 112 and second overhead storage bin 114 (shown in FIG. 2) based on the detection of motion within interior 138 by first motion sensor 120 and second motion sensor 124 (shown in FIG. 2). The data obtained by first profile sensor 122 and second profile sensor 126 is then transmitted to controller 128 (shown in FIG. 2) and, in one implementation, used to determine a rearrangement recommendation for objects within first overhead storage bin 112 and second overhead storage bin 114, for example.

The rearrangement recommendation is determined such that efficient use of remaining overhead storage space in the plurality of overhead storage bins 104 is provided to the users. For example, assume interior 138 has capacity for four full-sized objects 140 (i.e., each full-sized object 140 occupies 25% of the available capacity of first overhead storage bin 112). As shown, the three full-sized objects 140 occupy 75% of the available capacity within interior 138, and smaller object 142 occupies 10% of the available capacity. Moreover, assume second overhead storage bin 114 contains three full-sized objects and a smaller object occupying 15% of the interior of second overhead storage bin 114. Controller 128 then determines the rearrangement recommendation in which it is recommended that smaller object 142 be moved to second overhead storage bin 114. As such, second overhead storage bin 114 would be fully occupied and first overhead storage bin 112 would have capacity for another full-sized object 140.

In some implementations, controller 128 also determines the rearrangement recommendation based on the shape of the objects within first overhead storage bin 112 and second overhead storage bin 114. For example, controller 128 determines if irregularly shaped objects are capable of stacking on top of or next to each other to facilitate efficient use of the available overhead storage space. Once determined, controller 128 transmits the rearrangement recommendation to display device 134 (shown in FIG. 2) for execution at the user's discretion.

Figure 4:
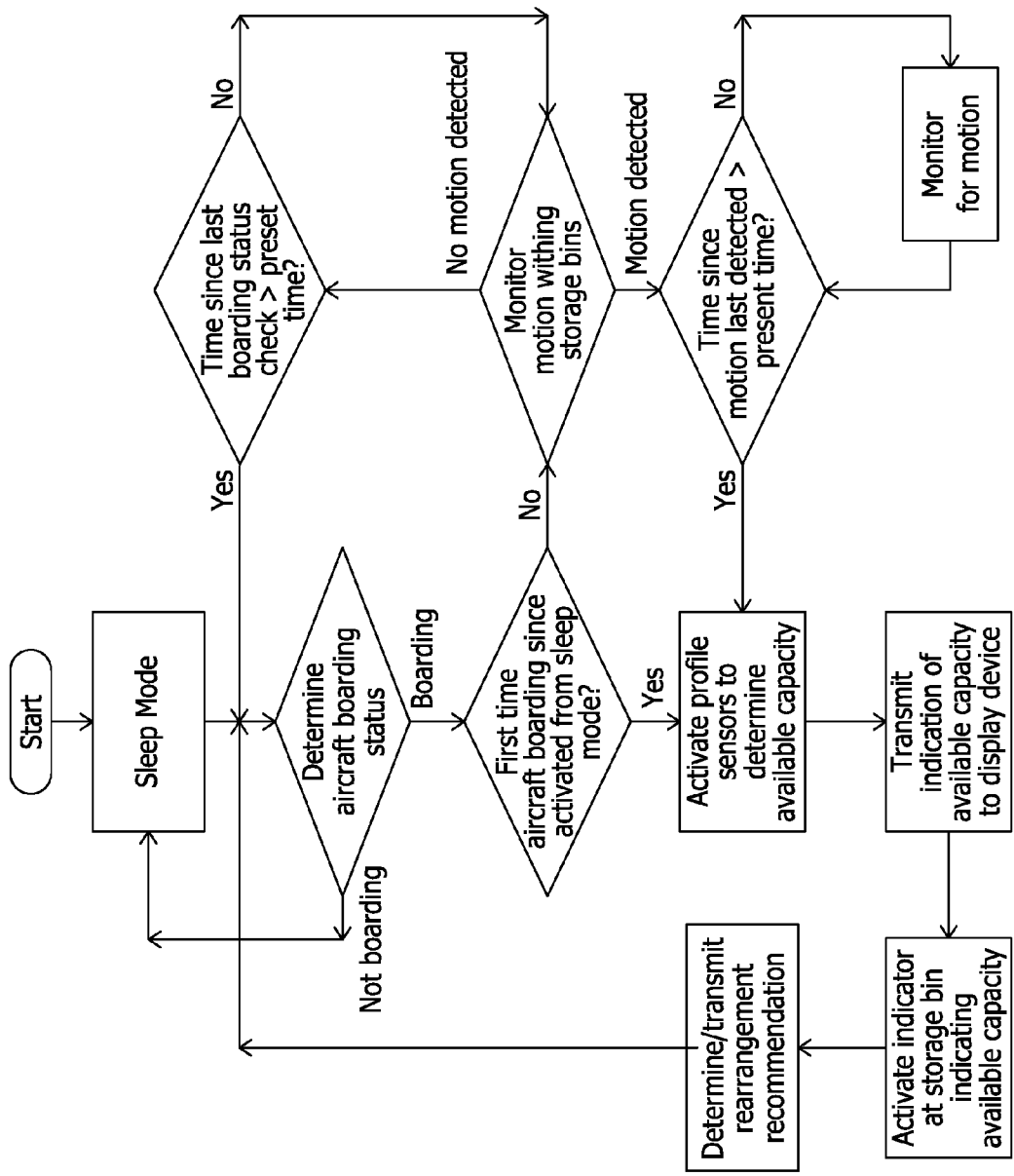
FIG. 4 is an exemplary logic diagram illustrating operation of the object allocation system shown in FIG. 2.

FIG. 4 is an exemplary logic diagram illustrating operation of object allocation system 110 (shown in FIG. 2). In the exemplary implementation, object allocation system 110 and, more specifically, the motion sensors are in a sleep mode state to conserve energy when not in use. Controller 128 then determines a boarding status of aircraft 100 to determine when to activate the motion sensors. In one implementation, controller 128 periodically determines the boarding status of aircraft 100 by determining the status of one or more boarding cues. For example, an exemplary boarding cue includes, but is not limited to, if the door of aircraft 100 is open. Alternatively, controller 128 determines the boarding status of aircraft 100 in response to receiving a boarding signal received from the flight crew or gate personnel, or in response to a boarding signal received based on an expected boarding schedule for aircraft 100.

Object allocation system re-enters the sleep mode state if aircraft 100 is not boarding. If aircraft 100 is boarding, object allocation system 110 is activated in accordance with the logic illustrated in FIG. 4. For example, controller 128 determines if object allocation system 110 has just been activated from the sleep mode state. If so, a preliminary analysis of the available capacity within the plurality of overhead storage bins 104 is executed. More specifically, controller 128 activates the profile sensors to determine the available capacity within the plurality of overhead storage bins 104, determines the available capacity, and transmits an indication of the available capacity to at least one of display device 134 or display devices 136.

Object allocation system 110 then begins to determine the loading status of the plurality of overhead storage bins 104 by passively monitoring changes in the available capacity within the plurality of overhead storage bins 104. More specifically, controller 128 activates the motion sensors from the sleep mode state when aircraft 100 is boarding. Motion sensors monitor motion within the plurality of overhead storage bins 104. If motion is detected in one or more overhead storage bins 104, controller 128 activates corresponding profile sensors based on the detection of motion. More specifically, controller 128 periodically activates the corresponding profile sensors at a preset time after motion within the one or more overhead storage bins 104 is no longer detected. For example, the preset time is up to about 10 seconds. As such, energy is conserved by periodically activating profile sensors only when changes in the available capacity within the plurality of overhead storage bins 104 have been made. Controller 128 then updates the available capacity displayed at display device 134 and display devices 136. In some implementations, controller 128 also determines and transmits a rearrangement recommendation to display device 134.

Controller 128 cycles through the process of activating motion sensors, determining the available capacity within the plurality of overhead storage bins 104, transmitting the indication of the available capacity, and rechecking to determine if aircraft 100 is still boarding multiple times during the boarding process. In the exemplary implementation, object allocation system 110 is deactivated automatically when the boarding process is complete. For example, controller 128 deactivates motion sensors for entry into the sleep mode state when motion is no longer detected in any of the plurality of overhead storage bins 104 for an amount of time greater than a preset time. More specifically, if an amount of since the last boarding status check is greater than the preset time, the boarding status is determined. If it is determined that aircraft 100 is not boarding, object allocation system 110 reenters the sleep mode state. In one implementation, object allocation system 110 stays in the sleep mode state and does not determine the boarding status for at least a preset time (e.g., five minutes) after reentering the sleep mode state.

A method of allocating objects within a plurality of storage bins is described herein. The method includes monitoring motion within the plurality of storage bins, wherein each storage bin of the plurality of storage bins includes a profile sensor coupled therein, and activating the profile sensor coupled within a first storage bin, the profile sensor activated based on detection of motion within the first storage bin. The method also includes determining, with the profile sensor, an available capacity within the first storage bin, and transmitting an indication of the available capacity within the first storage bin.

In one implementation, activating the profile sensor includes activating the profile sensor at a preset time after motion within the first storage bin is no longer detected. Moreover, transmitting an indication includes transmitting the indication to a display device positioned at the first storage bin. Alternatively, transmitting an indication includes transmitting the indication to a display device positioned remotely from the first storage bin.

The method also includes activating the profile sensor coupled within a second storage bin, the profile sensor activated based on detection of motion within the second storage bin, determining, with the profile sensor coupled within the second storage bin, an available capacity within the second storage bin, and determining a rearrangement recommendation for objects within the first storage bin and the second storage bin based on the available capacity within the first storage bin and the second storage bin.

Moreover, the method includes determining, with the profile sensor coupled within the first storage bin, a shape of the objects within the first storage bin, determining, with the profile sensor coupled within the second storage bin, a shape of the objects within the second storage bin, and determining the rearrangement recommendation for the objects within the first storage bin and the second storage bin based on the shape of the objects within the first storage bin and the second storage bin.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A vehicle comprising:
   a passenger cabin;
   a plurality of storage bins coupled within said passenger cabin, said plurality of storage bins comprising at least a first storage bin and a second storage bin; and
   an object allocation system comprising:
      a motion sensor coupled within each storage bin of said plurality of storage bins, said motion sensor configured to monitor motion within said plurality of storage bins;
      a profile sensor coupled within said each storage bin, said profile sensor configured to determine an available capacity within said plurality of storage bins; and
      a controller configured to:
         determine a boarding status of the vehicle;
         activate said motion sensor from a sleep mode state based on the boarding status of the vehicle;
         activate said profile sensor coupled within said first storage bin, said profile sensor activated based on detection of motion within said first storage bin;
         activate said profile sensor coupled within said second storage bin, said profile sensor activated based on detection of motion within said second storage bin;
         transmit an indication of the available capacity within said first storage bin; and
         determine a rearrangement recommendation for objects within said first storage bin and said second storage bin based on the available capacity within said first storage bin and said second storage bin.

2. The vehicle in accordance with claim 1, wherein said object allocation system further comprises a display device configured to receive the indication of the available capacity within said first storage bin, and to display the available capacity, wherein said display device is positioned at said first storage bin.

3. The vehicle in accordance with claim 1, wherein said object allocation system further comprises a display device configured to receive the indication of the available capacity within said first storage bin, and to display the available capacity, wherein said display device is positioned remotely from said first storage bin.

4. The vehicle in accordance with claim 1, wherein said controller is further configured to activate said profile sensor at a preset time after motion within said first storage bin is no longer detected.

5. The vehicle in accordance with claim 1, wherein said profile sensor is further configured to determine a shape of the objects within said first storage bin and said second storage bin, said controller further configured to:
   determine the rearrangement recommendation for the objects within said first storage bin and said second storage bin based on the shape of the objects within said first storage bin and said second storage bin.

6. The vehicle in accordance with claim 1, wherein said controller is further configured to
   activate said motion sensor when the vehicle is boarding.

7. The vehicle in accordance with claim 6, wherein said controller is further configured to deactivate said motion sensor for entry into the sleep mode state when motion is no longer detected in said first storage bin for an amount of time greater than a preset time.

8. The vehicle in accordance with claim 6, wherein said controller is further configured to determine the boarding status of the vehicle with a periodic check of the boarding status of the vehicle.

9. A method of allocating objects within a plurality of storage bins in a vehicle, said method comprising:
   determining a boarding status of the vehicle;
   monitoring motion within the plurality of storage bins with a motion sensor coupled therein, wherein the motion sensor is activated from a sleep mode state based on the boarding status of the vehicle, and wherein each storage bin of the plurality of storage bins includes a profile sensor coupled therein;
   activating the profile sensor coupled within a first storage bin, the profile sensor activated based on detection of motion within the first storage bin;
   activating the profile sensor coupled within a second storage bin, the profile sensor activated based on detection of motion within the second storage bin;
   determining, with the profile sensor, an available capacity within the first storage bin;
   determining, with the profile sensor coupled within the second storage bin, an available capacity within the second storage bin;

transmitting an indication of the available capacity within the first storage bin; and determining a rearrangement recommendation for objects within the first storage bin and the second storage bin based on the available capacity within the first storage bin and the second storage bin.

10. The method in accordance with claim 9, wherein activating the profile sensor comprises activating the profile sensor at a preset time after motion within the first storage bin is no longer detected.

11. The method in accordance with claim 9, wherein transmitting an indication comprises transmitting the indication to a display device positioned at the first storage bin.

12. The method in accordance with claim 9, wherein transmitting an indication comprises transmitting the indication to a display device positioned remotely from the first storage bin.

13. The method in accordance with claim 9 further comprising:

determining, with the profile sensor coupled within the first storage bin, a shape of the objects within the first storage bin;

determining, with the profile sensor coupled within the second storage bin, a shape of the objects within the second storage bin; and determining the rearrangement recommendation for the objects within the first storage bin and the second storage bin based on the shape of the objects within the first storage bin and the second storage bin.

14. A system for use in allocating objects within a plurality of storage bins in a vehicle, said system comprising:

a motion sensor coupled within each storage bin of the plurality of storage bins, said motion sensor configured to monitor motion within the plurality of storage bins, and said motion sensor configured for activation from a sleep mode state based on a boarding status of the vehicle;

a profile sensor coupled within each storage bin, said profile sensor configured to determine an available capacity within the plurality of storage bins; and a controller configured to:

activate said profile sensor coupled within a first storage bin of the plurality of storage bins, said profile sensor activated based on detection of motion within the first storage bin;

activate said profile sensor coupled within a second storage bin of the plurality of storage bins, said profile sensor activated based on detection of motion within the second storage bin;

transmit an indication of the available capacity within the first storage bin; and determine a rearrangement recommendation for objects within the first storage bin and the second storage bin based on the available capacity within the first storage bin and the second storage bin.

15. The system in accordance with claim 14 further comprising a display device configured to receive the indication of the available capacity, and to display the available capacity, wherein said display device is positioned remotely from the first storage bin.

16. The system in accordance with claim 14, wherein said controller is further configured to activate said profile sensor at a preset time after motion within the first storage bin is no longer detected.

17. The system in accordance with claim 14, wherein said profile sensor is further configured to determine a shape of the objects within the first storage bin and the second storage bin, said controller further configured to:

determine the rearrangement recommendation for the objects within the first storage bin and the second storage bin based on the shape of the objects within the first storage bin and the second storage bin.

* * * * *